(12) United States Patent
Sishtla

(10) Patent No.: US 11,661,948 B2
(45) Date of Patent: May 30, 2023

(54) COMPRESSOR WITH VIBRATION SENSOR

(71) Applicant: CARRIER CORPORATION, Palm Beach Gardens, FL (US)

(72) Inventor: Vishnu M. Sishtla, Manlius, NY (US)

(73) Assignee: Carrier Corporation, Palm Beach Gardens, FL (US)

( * ) Notice: Subject to any disclaimer, the term of this patent is extended or adjusted under 35 U.S.C. 154(b) by 178 days.

(21) Appl. No.: 17/255,027

(22) PCT Filed: May 11, 2020

(86) PCT No.: PCT/US2020/032323
§ 371 (c)(1),
(2) Date: Dec. 22, 2020

(87) PCT Pub. No.: WO2020/231910
PCT Pub. Date: Nov. 19, 2020

(65) Prior Publication Data
US 2021/0262478 A1 Aug. 26, 2021

Related U.S. Application Data

(60) Provisional application No. 62/846,087, filed on May 10, 2019.

(51) Int. Cl.
*F04D 27/00* (2006.01)
*F04D 29/056* (2006.01)
(Continued)

(52) U.S. Cl.
CPC ......... *F04D 27/001* (2013.01); *F04D 29/056* (2013.01); *F04D 29/059* (2013.01);
(Continued)

(58) Field of Classification Search
None
See application file for complete search history.

(56) References Cited

U.S. PATENT DOCUMENTS

7,502,768 B2 3/2009 Ahmed et al.
8,571,955 B2 10/2013 Al Faruque et al.
(Continued)

FOREIGN PATENT DOCUMENTS

CN 1086808 6/2002
CN 202673683 1/2013
(Continued)

OTHER PUBLICATIONS

Kokhanov et al. (RU-2209348-C2) and machine translation (Year: 2003).*
(Continued)

*Primary Examiner* — Juan G Flores
(74) *Attorney, Agent, or Firm* — Carlson, Gaskey & Olds, P.C.

(57) ABSTRACT

A bearing support (26) for a compressor (10) includes an annular body. The annular body includes a circle opening (28) that is configured to receive a bearing (21) and a shaft (20). A tapered portion (30) is tapered away from the circular opening. The tapered portion (30) includes a passage (32). A vibration sensor (34) is situated in the passage. A compressor and a method of sensing vibration adjacent a bearing in a compressor are also disclosed.

17 Claims, 3 Drawing Sheets

(51) Int. Cl.
*F16C 35/02* (2006.01)
*G01H 17/00* (2006.01)
*F04D 29/059* (2006.01)
*F04D 25/06* (2006.01)

(52) U.S. Cl.
CPC ............ *F16C 35/02* (2013.01); *G01H 17/00* (2013.01); *F04D 25/06* (2013.01); *F05D 2270/334* (2013.01); *F16C 2360/00* (2013.01)

(56) References Cited

U.S. PATENT DOCUMENTS

| | | |
|---|---|---|
| 8,600,572 B2 | 12/2013 | Sri-Jayantha |
| 8,653,968 B2 | 2/2014 | Brown et al. |
| 8,818,563 B2 | 8/2014 | Gwerder et al. |
| 8,872,379 B2 | 10/2014 | Ruiz et al. |
| 8,880,226 B2 | 11/2014 | Raman et al. |
| 8,880,231 B2 | 11/2014 | Boucher et al. |
| 8,957,634 B2 | 2/2015 | Lo et al. |
| 9,076,111 B2 | 7/2015 | Delorme et al. |
| 9,348,952 B2 | 5/2016 | Wen et al. |
| 9,367,108 B2 | 6/2016 | Asghari et al. |
| 9,429,927 B2 | 8/2016 | Nesler et al. |
| 9,471,082 B2 | 10/2016 | Sloop et al. |
| 9,519,874 B2 | 12/2016 | Macek et al. |
| 9,535,411 B2 | 1/2017 | Wei et al. |
| 9,568,519 B2 | 2/2017 | Hwang et al. |
| 9,575,475 B2 | 2/2017 | Drees et al. |
| 9,595,070 B2 | 3/2017 | Matsuoka et al. |
| 9,667,107 B2 | 5/2017 | Yamada et al. |
| 9,671,768 B2 | 6/2017 | Lo et al. |
| 9,731,615 B2 | 8/2017 | Uyeki et al. |
| 9,740,183 B2 | 8/2017 | Chen |
| 2004/0102937 A1 | 5/2004 | Ibrahim |
| 2010/0017045 A1 | 1/2010 | Nesler et al. |
| 2010/0138363 A1 | 6/2010 | Batterberry et al. |
| 2012/0316914 A1 | 12/2012 | Lee et al. |
| 2014/0172400 A1 | 6/2014 | Majewski et al. |
| 2014/0312128 A1 | 10/2014 | Matsuoka et al. |
| 2014/0358508 A1 | 12/2014 | Raghunathan et al. |
| 2015/0178421 A1 | 6/2015 | Borrelli et al. |
| 2015/0248118 A1 | 9/2015 | Li et al. |
| 2015/0316282 A1 | 11/2015 | Stone et al. |
| 2016/0276832 A1 | 9/2016 | Kawai et al. |
| 2016/0291561 A1 | 10/2016 | Al-Mohssen et al. |
| 2016/0320081 A1 | 11/2016 | Nikovski |
| 2016/0334825 A1 | 11/2016 | Nesler et al. |
| 2016/0370778 A1 | 12/2016 | Kopp et al. |
| 2017/0083037 A1 | 3/2017 | Soo |
| 2017/0089601 A1 | 3/2017 | Patil et al. |
| 2017/0102162 A1 | 4/2017 | Drees et al. |
| 2017/0163084 A1 | 6/2017 | Malone |
| 2017/0177766 A1 | 6/2017 | Song et al. |
| 2017/0207633 A1 | 7/2017 | Nakayama et al. |
| 2017/0256004 A1 | 9/2017 | Hooshmand et al. |
| 2018/0196456 A1 | 7/2018 | Elbsat |
| 2018/0209674 A1 | 7/2018 | Ridder et al. |
| 2018/0328375 A1 * | 11/2018 | Betschart ............ F16C 32/0442 |

FOREIGN PATENT DOCUMENTS

| | | |
|---|---|---|
| CN | 103953560 | 7/2014 |
| CN | 204142211 | 2/2015 |
| CN | 204477091 | 7/2015 |
| CN | 105952688 | 9/2016 |
| CN | 106768642 | 5/2017 |
| CN | 109103636 | 12/2018 |
| EP | 2551451 | 1/2013 |
| JP | 2011128111 | 6/2011 |
| JP | 5187442 | 4/2013 |
| JP | 5622177 | 11/2014 |
| KR | 20160087299 | 7/2016 |

OTHER PUBLICATIONS

International Search Report and Written Opinion for International Application No. US2020/032323 dated Aug. 18, 2020.
Petry, Nico "Experimental Study of Acoustic Resonances in the Side Cavities of a High-Pressure Centrifugal Compressor Excited by Rotor/Stator Interaction". Proceedings of ASME Turbo Expo 2010. Jun. 2020. pp 1-13.
International Preliminary Report on Patentability for International Patent Application No. PCT/US2020/032323 dated Nov. 25, 2021.

* cited by examiner

COMPRESSOR WITH VIBRATION SENSOR

CROSS-REFERENCE TO RELATED APPLICATIONS

This application claims priority to U.S. Provisional Application No. 62/846,087, which was filed on May 10, 2019, and is incorporated by reference herein in its entirety.

BACKGROUND

Generally, centrifugal compressors compress fluid by rotation of one or more impellers via a shaft. The shaft and impellers can be rotated by a motor, such as an electric motor. The impellers impart kinetic energy to the fluid, then, the fluid passes through a diffuser, which slows the flow of the fluid and converts the kinetic energy into an increase in pressure (e.g., compression).

During operation of compressors, vibrations can cause compressor components to become misaligned with one another, can cause wear on compressor components, and/or can reduce the lifetime of certain compressor components.

SUMMARY

A bearing support for a compressor according to an example of this disclosure includes an annular body. The annular body includes a circle opening that is configured to receive a shaft and bearing and a shaft. A tapered portion is tapered away from the circular opening. The tapered portion includes a passage. A vibration sensor is situated in the passage.

In a further example of the foregoing embodiments, a removable end cap closes the passage.

In a further example of any of the foregoing embodiments, a cord is operable to connect the vibration sensor to at least one electronic component.

In a further example of any of the foregoing embodiments, the passage includes a reduced diameter portion.

In a further example of any of the foregoing embodiments, a sensing element of the vibration sensor is situated in the reduced diameter portion.

In a further example of any of the foregoing embodiments, the shaft is a shaft of a compressor.

A compressor according to an example of this disclosure includes a housing. At least one impeller is situated inside the housing and is configured to be rotated by a shaft. There is at least one bearing support. At least one bearing is situated in the bearing support and configured to facilitate rotation of the shaft. A vibration sensor is situated in the bearing support.

In a further example of the foregoing embodiments, a cord is operable to connect the vibration sensor to at least one electronic component.

In a further example of any of the foregoing embodiments, the bearing support includes an annular body. The annular body includes a circular opening that is configured to receive the bearing, and a tapered portion tapering away from the circular opening. The tapered portion includes a passage, where the vibration sensor is situated in the passage.

In a further example of any of the foregoing embodiments, a removable cap closes the passage.

In a further example of any of the foregoing embodiments, the passage includes a reduced diameter portion.

In a further example of any of the foregoing embodiments, a sensing element of the vibration sensor is situated in the reduced diameter portion.

In a further example of any of the foregoing embodiments, a radially outermost end of the tapered portion is arranged adjacent an axial end of the housing.

In a further example of any of the foregoing embodiments, the passage is accessible from outside of the housing via a removable cap.

In a further example of any of the foregoing embodiments, the vibration sensor is separated from the bearing by a portion of the bearing support. The portion of the bearing support has a thickness that is less than about 1 inch (2.54 cm).

In a further example of any of the foregoing embodiments, at least one impeller is situated inside the housing and configured to be rotated by a shaft.

A method of sensing vibration adjacent a bearing in a compressor according to an example of this disclosure includes communicating signals from a vibration sensor to at least one electrical component. The vibration sensor is situated in a bearing support. The bearing support includes an annular body. The annular body includes a circular opening that os configured to receive a bearing, and a tapered portion tapering away from the circular opening. The tapered portion includes a passage, and the vibration sensor is situated in the passage.

In a further example of the foregoing method, communication occurs via a cord.

In a further example of any of the foregoing methods, the vibration sensor is separated from the bearing by a portion of the bearing support. The portion of the bearing support has a thickness that is less than about 1 inch (2.54 cm).

In a further example of any of the foregoing methods, the passage is accessible via a removable cap.

DETAILED DESCRIPTION

Figure 1:
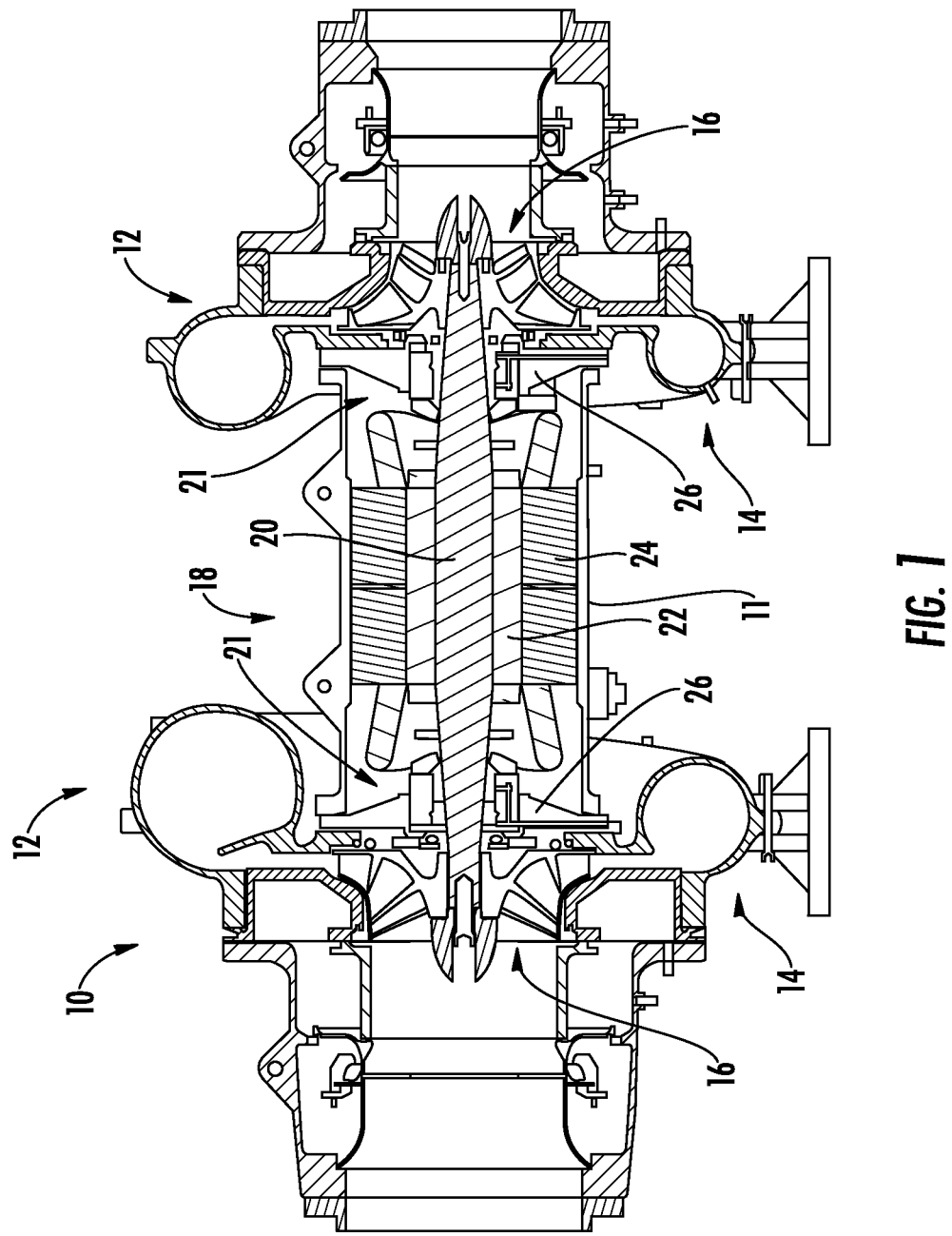
FIG. 1 schematically illustrates a compressor.

An example compressor 10 is schematically shown in FIG. 1. In this example, the compressor 10 is a centrifugal compressor, though other compressors are contemplated by this disclosure. The compressor 10 includes a housing 11, suction (inlet) ports 12, and discharge (outlet) ports 14. The compressor 10 includes one or more impellers 16 which rotate to draw fluid from the suction ports 12 and compress the fluid. An example fluid is refrigerant.

An electric motor 18 drives the impellers 16 via a shaft 20. Bearings 21 facilitate rotation of the shaft 20. In this example, the compressor 10 includes one shaft 20 that drives two impellers 16, each of which is associated with a suction port 12 and a discharge port 14, though other arrangements are contemplated.

The motor 18 includes a stator 22 and a rotor 24. As is generally known, the stator 22 remains stationary while the rotor 24 rotates due to electromagnetic forces generated by the interaction of the rotor 24 and stator 22. The rotor 24 rotates the shaft 20, which in turn rotates the impellers 16 as discussed above.

Figure 2:
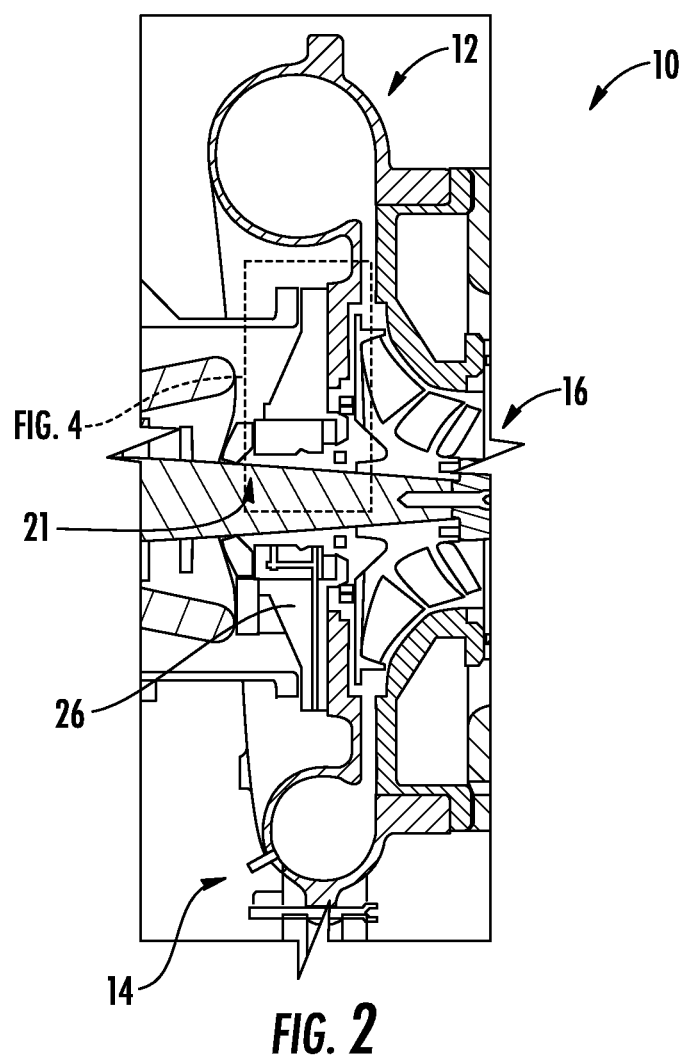
FIG. 2 schematically illustrates a detail view of a bearing and bearing support of the compressor of FIG. 1.
Figure 4:
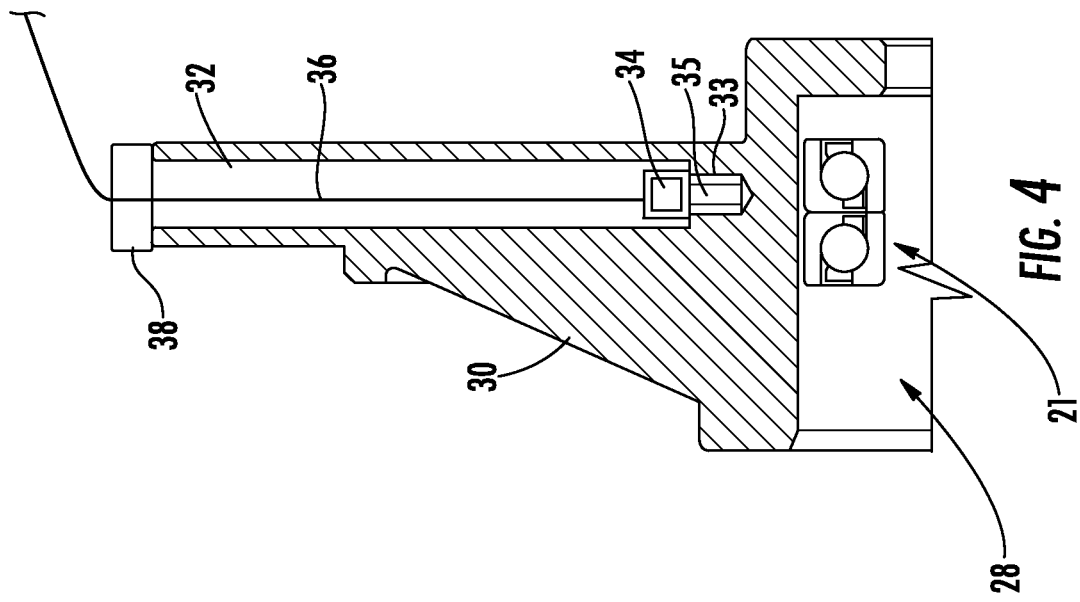
FIG. 4 illustrates a detail view of the bearing support of FIGS. 1-3B.
Figure 3B:
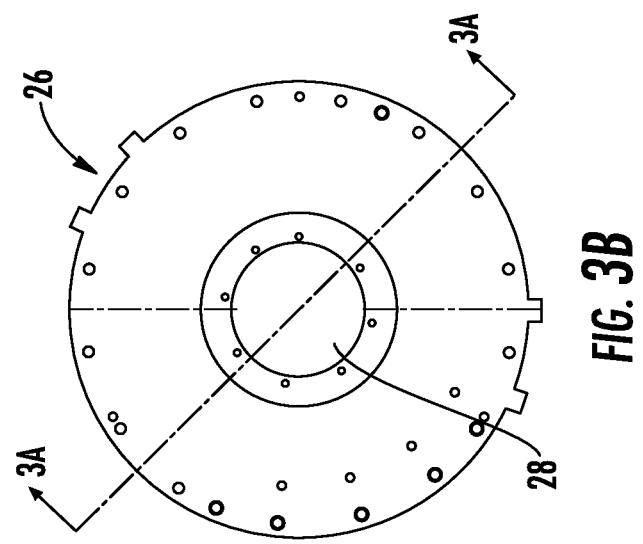
FIG. 3B illustrates another view of the bearing support of FIGS. 1-2.
Figure 3A:
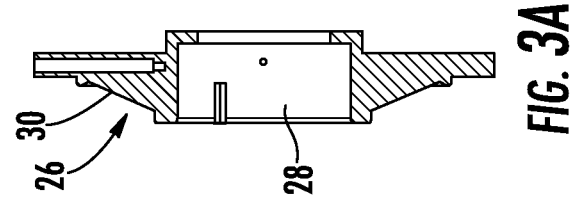
FIG. 3A illustrates a perspective view of the bearing support of FIGS. 1-2.

FIGS. 2-4 show detail views of the bearings 21. As shown, the bearings 21 are each situated in a bearing support 26. FIGS. 3A-B and 4 show the bearing support 26. The bearing support 26 is annular and includes a circular opening 28 in which the bearing 21 and shaft 20 are situated (FIG. 1). The bearing support 26 also includes a tapered portion 30 tapering away from the circular opening 28.

The tapered portion 30 includes a passage 32. A vibration sensor 34 having a sensing element 35 is situated in the passage 32. In a particular example, the passage 32 includes a reduced diameter portion 33 at its radially innermost end, and the sensing element 35 is situated in the reduced diameter portion 33.

In one example, a diameter of the passage is between about 1.5 and 2 times a diameter of the vibration sensor 34. In one example, at least a portion of the passage 32 and at least a portion of the vibration sensor 34 are threaded so that the respective threads are configured to engage one another.

A cord 36 connects the vibration sensor 34 to other electric components in the compressor 10 (not shown) to provide electronic communication between the vibration sensor 34 and the other electronic components. For example, the other electronic components include a controller having electronics programmed to receive, analyze, and/or communicate signals from the vibration sensor 34. In one example, the controller is also operable to change operation of the compressor 36 based on signals from the vibration sensor 24. For instance, if vibrations sensed by the vibration sensor 34 exceed a predetermined threshold, the controller may direct the compressor 10 to operate at a lower speed, e.g., by sending a signal to the motor 18.

The cord 36 also provides power to the vibration sensor 34 from a power source. The cord 36 extends through a removable cap 38 which closes the passage 32. The removable cap protects the vibration sensor 34 in the passage 32, e.g., from the fluid being compressed by the compressor 10. Because the vibration sensor 34 is protected inside the passage 32, it need not be selected to be compatible with the fluid, and therefore, less expensive more readily available vibration sensors can be used. Accordingly, the vibration sensor 34 can be any known type of vibration sensor, such as an accelerometer, a bidirectional vibration sensor, or a triaxial vibration sensor.

The cord 36 provides fast and accurate data transmission from the vibration sensor 34 to the other electronic components of the compressor 10. For instance, the other electronic components may be mounted on an outer surface of the housing 11. In this example, because the cord 36 provides signals to the other electrical components, there is no loss of signal quality due to the signal travelling through the housing 11.

The situation of the vibration sensor 34 in the bearing support 26 allows for easy removal of the vibration sensor 34 from the compressor 10 for repair or replacement. As best shown in FIG. 2, the bearing support 26 extends adjacent the housing 11 so that the end cap 38 is easily removable from the exterior of the compressor 10 for access to the passage 32 and thus the vibration sensor 34. In particular, a radially outward end of the tapered portion 30 is arranged adjacent an axial end of the housing 11.

Furthermore, the vibration sensor 34 is not situated within the pressure boundary of the compressor 11, which is generally defined by the housing 11. Therefore, there is no need for sealing around the vibration sensor 34 to maintain pressure within the pressure boundary of the compressor 10, which is important for compressor 10 operation, and no risk of leakage around seals.

The vibration sensor 34 is configured to measure vibration adjacent the bearings 21. Vibrational loads that exceed the capacity of the bearing 21 can cause the bearing 21 to fail prematurely. Accordingly, monitoring the vibrational loads adjacent the bearing 21 prevents failure of the bearing 21 by indicating that loads must be reduced (e.g., that the compressor 10 be operated at a lower pressure), for example, to a controller as discussed above. To that end, the sensing element 35 of the vibration sensor is separated from the bearing 21, and in particular an outer race 21B of the bearing 21, only by a thickness T of the bearing support 26 (FIG. 4). In some examples, the thickness T is less than about 1 inch (2.54 cm). In a more particular example, the thickness T is between about 0.375 and 0.5 inches (9.53 and 12.7 mm). Accordingly, the vibration sensor 34 can measure vibrational loads acting on the bearing 21 accurately The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A bearing support for a compressor, comprising:
   an annular body, the annular body including:
      a circular opening configured to receive a bearing and a shaft, and
      a tapered portion tapering away from the circular opening, the tapered portion including a passage; and
      a vibration sensor situated in the passage, wherein the passage includes a reduced diameter portion, and wherein a sensing element of the vibration sensor is situated in the reduced diameter portion.

2. The bearing support of claim 1, further comprising a removable end cap closing the passage.

3. The bearing support of claim 1, further comprising a cord operable to connect the vibration sensor to at least one electronic component.

4. The bearing support of claim 1, wherein the shaft is a shaft of a compressor.

5. A compressor, comprising:
   a housing;
   at least one bearing support; and
   at least one bearing situated in the at least one bearing support and configured to facilitate rotation of a shaft; and
   a vibration sensor situated in the at least one bearing support, wherein the at least one bearing support includes an annular body, the annular body including a circular opening configured to receive the at least one bearing, and a tapered portion tapering away from the circular opening, the tapered portion including a passage, wherein the vibration sensor is situated in the passage, and wherein the vibration sensor is separated from the at least one bearing by a portion of the at least one bearing support.

6. The compressor of claim 5, further comprising a cord operable to connect the vibration sensor to at least one electronic component.

7. The compressor of claim 5, further comprising a removable cap closing the passage.

8. The compressor of claim 5, wherein the passage includes a reduced diameter portion.

9. The compressor of claim 8, wherein a sensing element of the vibration sensor is situated in the reduced diameter portion.

10. The compressor of claim 5, wherein a radially outermost end of the tapered portion is arranged adjacent an axial end of the housing.

11. The compressor of claim 5, wherein the passage is accessible from outside of the housing via a removable cap.

12. The compressor of claim 5, wherein the portion of the at least one bearing support has a thickness that is less than about 1 inch (2.54 cm).

13. The compressor of claim 5, further comprising at least one impeller situated inside the housing and configured to be rotated by the shaft.

14. A method of sensing vibration adjacent a bearing in a compressor, comprising:
communicating a signal from a vibration sensor to at least one electrical component, the vibration sensor situated in a bearing support, wherein the bearing support includes an annular body, the annular body including a circular opening configured to receive a bearing, and a tapered portion tapering away from the circular opening, the tapered portion including a passage, wherein the vibration sensor is situated in the passage, wherein the vibration sensor is separated from the bearing by a portion of the bearing support.

15. The method of claim 14, wherein the communicating is via a cord.

16. The method of claim 14, wherein the portion of the bearing support has a thickness that is less than about 1 inch (2.54 cm).

17. The method of claim 14, further comprising changing operation of the compressor based on the signal from the vibration sensor.

* * * * *